United States Patent
Mück et al.

(10) Patent No.: US 7,906,594 B2
(45) Date of Patent: Mar. 15, 2011

(54) PROCESS FOR PREPARATION OF POLYMER BLENDS COMPOSED OF POLYOXYMETHYLENES AND OF THERMOPLASTIC ELASTOMERS

(75) Inventors: Karl-Friedrich Mück, Wiesbaden (DE); Ernst Hofmann, Haibach (DE); Michael Hoffmockel, Niedernhausen (DE)

(73) Assignee: Ticona GmbH, Kelsterbach (DE)

( * ) Notice: Subject to any disclaimer, the term of this patent is extended or adjusted under 35 U.S.C. 154(b) by 1032 days.

(21) Appl. No.: 11/520,415

(22) Filed: Sep. 13, 2006

(65) Prior Publication Data

US 2007/0060715 A1 Mar. 15, 2007

Related U.S. Application Data

(60) Provisional application No. 60/718,550, filed on Sep. 19, 2005.

(30) Foreign Application Priority Data

Sep. 14, 2005 (DE) .......................... 10 2005 043 737

(51) Int. Cl.
*C08L 61/02* (2006.01)
(52) U.S. Cl. ...... 525/399; 264/6; 264/176.1; 264/178 R; 264/211.21; 264/211.23; 428/524; 525/398; 525/400; 525/401; 525/453; 525/456; 528/230; 528/270
(58) Field of Classification Search .................. 525/398, 525/399, 400, 403, 453, 401, 456; 528/230, 528/270; 264/6, 176.1, 178 R, 211.21, 211.23; 428/524
See application file for complete search history.

(56) References Cited

U.S. PATENT DOCUMENTS

| 4,683,267 A | * | 7/1987 | Lindner et al. ................ 525/133 |
| 5,310,822 A | | 5/1994 | Kielhorn-Bayer et al. |
| 5,318,813 A | * | 6/1994 | Flexman, Jr. ................ 428/36.9 |
| 6,833,397 B2 | * | 12/2004 | Miyamoto et al. ............ 523/344 |
| 6,908,573 B2 | * | 6/2005 | Hossan ........................ 252/511 |
| 2001/0049415 A1 | | 12/2001 | Kim et al. |

FOREIGN PATENT DOCUMENTS

EP 0 277 630 8/1988

OTHER PUBLICATIONS

Xinda SJW Co-Kneader Product Data [online], retrieved via the Internet [accessed on Jun. 29, 2009], URL: <http://www.xindacorp.com/products/co-kneader/?n=3-14>.*
Callari, James J.; Micropellets: Little things mean a lot; Plastics World, Nov. 1994, p. 20-22.*

* cited by examiner

*Primary Examiner* — James Seidleck
*Assistant Examiner* — Robert Jones
(74) *Attorney, Agent, or Firm* — Dority & Manning, P.A.

(57) ABSTRACT

The invention relates to a process for preparation of polymer blends comprising at least one polyoxymethylene and at least one thermoplastic elastomer, where the thermoplastic elastomer is micropelletized by a pelletizing process and the pellets obtained in a) are dispersed in the polyoxymethylene matrix via melting of the components and mixing of these at low shear forces, and also to the use of micropelletized thermoplastic elastomers for preparation of polyoxymethylenes with low formaldehyde emission.

17 Claims, No Drawings

PROCESS FOR PREPARATION OF POLYMER BLENDS COMPOSED OF POLYOXYMETHYLENES AND OF THERMOPLASTIC ELASTOMERS

The present invention relates to a process for preparation of low-emission polymer blends composed of a polyoxymethylene matrix and of thermo-plastic elastomers dispersed therein.

Polyoxymethylenes have good mechanical properties and are therefore used in many application sectors, either as a constituent of engineering components or else as cladding elements, and the mechanical property profile of the polyoxymethylenes here can be further improved via admixture of certain other polymers. By way of example, thermoplastic polyurethanes are admixed with a polyoxymethylene in order to obtain polymer blends with improved mechanical properties, in particular with improved notched impact resistances. Examples of these blends are known from U.S. Pat. No. 5,310,822 or US 2001/0049415 A1.

The improvement in the mechanical properties here is not only a function of the constitution of the polymer mixture. The underlying process for preparation of the polymer blends also affects the mechanical property profile of the moldings obtainable therefrom.

When the blends are prepared from a polyoxymethylene and a thermoplastic elastomer it is usual to mix pellets of these and melt them and mix them by using a suitable apparatus, e.g. mixers, kneaders, or extruders. High shear forces have to be exerted here and this results in some degree of reduction in the molecular weight of the individual polymers and increased formaldehyde emission.

A possible method for counteracting the degradation of the polymer mixture incorporates the TPU structural components into the polyoxymethylene at an elevated temperature, these completing their reaction with the polyoxymethylene only after the mixing process (EP 0 277 630). This type of process can give blends composed of thermoplastic polyurethanes and of polyoxymethylenes with improved low-temperature impact resistance. However, operation of the process is difficult because of the necessary subsequent catalytic reaction in the polyoxymethylene matrix. Furthermore, the degradation of the polyoxymethylene can be reduced only to a certain extent, with resultant difficulty in preparation of low-emission products.

It is an object of the present invention to provide a process which can prepare polymer blends composed of polyoxymethylenes and of a thermoplastic elastomer with good notched impact resistance and low formaldehyde emission, while utilizing mechanical mixing of the two polymeric components.

The object is achieved via a process in which the thermoplastic elastomer is micropelletized via underwater pelletization and then is dispersed with low shear forces into the polyoxymethylene matrix.

The present invention therefore provides a process for preparation of polymer blends comprising at least one polyoxymethylene and at least one thermoplastic elastomer, where
a) the thermoplastic elastomer is micropelletized by a pelletizing process and
b) the pellets obtained in a) are dispersed in the polyoxymethylene matrix via melting and mixing of the components.

Examples of thermoplastic elastomers that can be used are thermoplastic polyesters (TPE), thermoplastic polyamide (TPA), and particularly preferably thermoplastic polyurethanes (TPU). Particular preference is given to thermoplastic polyurethanes of Elastollan® type (Elastogran), in particular Elastollan® B85A, Elastollan® SP853, or Elastollan® G2902. Among the thermoplastic polyurethanes are in particular also polyurethane rubbers which also contain polyester segments and/or polyether segments, alongside polyurethane segments.

It is preferable to use pellets composed of thermoplastic elastomer whose average particle diameter is from 50 µm to 1000 µm, particularly preferably from 200 µm to 700 µm (micropelletized thermoplastic elastomer). Pellets composed of a thermoplastic elastomer with such low average particle diameter are preferably produced by means of underwater pelletization, whereupon the structure of the thermoplastic elastomer remains intact, and no degradation processes could be observed in the elastomer. The underwater pelletization of the thermoplastic elastomer is preferably conducted with use of a screw extruder, the elastomer preferably being melted at a temperature of from 100° C. to 300° C., particularly preferably from 150° C. to 250° C., at a preferred pressure of from 1 to 200 bar. The zone temperature is preferably from 150° C. to 250° C., particularly preferably from 170° C. to 200° C. The underwater pelletization then takes place by way of passage through a pelletizing die whose preferred hole diameter is from 0.05 mm to 1 mm, particularly preferably from 0.2 mm to 0.7 mm, the die having been heated to a temperature of from 100° C. to 500° C., particularly preferably from 200° C. to 350° C. The thermoplastic elastomer is easy to cut after passage through the die, making it possible to achieve an average particle diameter in the abovementioned micrometer range.

In one preferred variant, the micropellets obtained by means of underwater pelletization are dried before they are dispersed in the polyoxymethylene matrix. Residual moisture levels below 1% by weight, preferably below 0.5% by weight, based on the weight of the thermoplastic elastomer, can be achieved here. The drying process preferably takes place at room temperature or at slightly elevated temperatures at from 20° C. to 100° C., particularly preferably from 30° C. to 60° C., and operations can also take place under reduced pressure (below 1 bar).

The dispersion of the micropellets in the polyoxymethylene matrix takes place via the melting of the components, preferably at a temperature of from 180° C. to 260° C., particularly preferably from 190° C. to 210° C., and the mixing of the individual components in conventional mixing assemblies, e.g. kneaders or extruders. If low-pressure mixing assemblies are used, the melting and mixing can also take place at lower temperatures, preferably at from 20° C. to 180° C. The processing of the individual components generally takes place at a pressure of from 1 to 200 bar, preferably from 10 to 30 bar.

A very advantageous factor in the dispersion of micropelletized thermoplastic elastomers in polyoxymethylenes is that the mixing assemblies used can be operated with low shear forces. "Low" shear forces here means values below the shear forces that have to be used in the preparation of a comparable polymer mixture comprising a polyoxymethylene and a thermoplastic elastomer with conventional average particle diameters above 1 mm in order to achieve good (Charpy) notched impact resistances of the polymer mixture of from 10 to 20 kJ/m$^2$. The use of micropelletized thermoplastic elastomers is a precondition for their good dispersion in a polyoxymethylene matrix using low shear forces, the result being polymeric molding compositions which have not only comparably good notched impact resistance but also markedly reduced formaldehyde emission. By way of example, therefore, the dispersion of the thermoplastic elastomer in a polyoxymethylene matrix takes place in a screw extruder with specific energy input of from 0.2 to 0.25 kWh/kg in order to achieve the abovementioned notched impact resistances. The specific energy input needed to obtain polyoxymethylene molding compositions with equally good notched impact resistance is markedly less than 0.2 kWh/kg.

The specific energy input preferably used for the dispersion of the elastomer is from 0.05 to 0.180 kWh/kg, particularly preferably from 0.08 to 0.15 kWh/kg.

In order to obtain maximum homogeneity of distribution of the individual components in the polyoxymethylene molding composition, it is, of course, likewise advantageous to achieve good mixing of the solid micropelletized thermoplastic elastomer and, if appropriate, other additives with the polyoxymethylenes used and, if appropriate, other polymers, prior to the melting process.

The resultant molding compositions can be further processed easily to give the desired moldings and preferably have a melt index of from 1 to 30 ml/10 min (MVR value determined to ISO 1133). The resultant moldings feature good mechanical properties, in particular high notched impact resistance. Furthermore, the inventive process can considerably lower formaldehyde emission from the resultant POM/thermoplastic elastomer molding compositions and moldings. For example, the claimed process can give molding compositions, in particular POM/TPU molding compositions, whose formaldehyde emission is below 20 mg/kg, preferably below 10 mg/kg, of molding composition. In the case of individual polyoxymethylenes, formaldehyde emission can indeed be lowered to excellent values markedly below 5 mg/kg of the molding composition.

Among the polyoxymethylenes that can be used are in particular homo- or copolymers which encompass oxymethylene units. Preferred polyoxymethylenes are unbranched and have at least 50 mol %, preferably above 80 mol %, particularly preferably above 90 mol %, content of oxymethylene units ($-CH_2-O-$). By way of example, the polymers are obtainable via polymerization of formaldehyde monomers or of cyclic formaldehyde oligomers, e.g. trioxane or tetraoxocane, and, if appropriate, of suitable comonomers.

Particularly suitable comonomers that may be mentioned are cyclic ethers and cyclic acetals, and linear polyacetals, or derivatives of these. Preference is given to cyclic ethers having from 2 to 4 carbon atoms or cyclic acetals having from 3 to 5 carbon atoms. Examples which may be mentioned of preferred comonomers are ethylene oxide, propylene 1,2-oxide, butylene 1,2-oxide, butylene 1,3-oxide, 1,3-dioxane, 1,3-dioxolane, and 1,3-dioxepan, and linear oligo- or polyformals, e.g. polydioxolane or polydioxepan.

Preferred branching comonomers are polyfunctional compounds which have at least two reactive groups selected independently from one another from the group of the cyclic ethers and of the cyclic acetals, which may have linkage by way of an ether radical or polyether radical having from 2 to 20 carbon atoms. Preference is given here to cyclic ethers having from 2 to 4 carbon atoms and to cyclic acetals having from 3 to 5 carbon atoms. Specific comonomers of this type can be grouped under the formula (I) $A-CH_2-Z-CH_2-A'$, where A and A' are a cyclic ether group or cyclic acetal group, and Z is $-O-$ or $-O-R-O-$, where R is ($C_1$-$C_8$)-alkylene. Particularly preferred branching comonomers of the formula (I) are ethylene diglycide, diglycidyl ether, diethers composed of glycidyl compounds and formaldehyde, preferably in a molar ratio of 2:1, diethers composed of glycidyl compounds and of aliphatic ($C_2$-$C_8$) diols, preferably in a molar ratio of 2:1, e.g. diglycidyl ether of ethylene glycol, 1,4-butanediol, 1,3-butanediol, 1,3-cyclobutanediol, 1,2-propanediol, or 1,4-cyclohexane-diol, and also diglycerol diformal.

The comonomers mentioned can moreover bear identical or different substituents preferably selected from the group of the ($C_1$-$C_{30}$)-alkyl, ($C_3$-$C_{20}$)-cycloalkyl, and ($C_1$-$C_{30}$)-alkoxy substituents.

The content of the comonomer units in the oxymethylene copolymers is preferably from 0.1 to 20 mol %, particularly preferably from 0.5 to 10 mol %. Particularly preferred copolymers are polyoxymethylenes composed of from 99.5 to 95 mol % of trioxane and from 0.5 to 5 mol % of one of the abovementioned comonomers. Suitable copolymers are also disclosed by way of example in U.S. Pat. No. 5,310,822.

The hydroxy end groups of the polyoxymethylenes used, in particular of the oxymethylene homopolymers, have preferably been protected from chemical degradation. This preferably takes place via esterification or etherification of the terminal hydroxy groups.

The melting point of the preferred POM polymers is generally at least 150° C. and their molecular weight (weight-average) $M_w$ are generally in the range from 5000 to 200 000, preferably from 7000 to 150 000.

The melt index (MVR value) of preferred polyoxymethylene homo- or copolymers is from 2 to 50 ml/10 min, particularly preferably from 5 to 35 ml/10 min (determined to ISO 1133). Elastomer-modified POM molding compositions with extremely low formaldehyde-emission values can be prepared in particular with polyoxymethylene copolymers whose comonomer content is from 0.5 to 5% by weight and whose MVR value is from 15 to 30 as matrix.

A feature of the preferred homo- and copolymers described here, in particular if they have been end-group-stabilized and/or have from 0.1 to 20 mol % of comonomers, in particular oxyethylene monomers, incorporated into the polymer, these preferably having random distribution in the polymer chain, is that their formaldehyde emission is very low and is also substantially retained during the incorporation of micropelletized thermoplastic elastomers by the inventive process, whereas the use of conventional preparation processes, e.g. simple extrusion of a mixture composed of a polyoxymethylene with conventional pellets of a thermoplastic elastomer, gives a marked rise in the formaldehyde emission of the resultant molding composition. Commercially available pellets often lack the correct dispersibility in the polyoxymethylene matrix, even when high shear forces are used during the extrusion process, a consequence of this being that the notched impact resistance of the molding compositions obtainable is not ideal.

Furthermore, in the inventive process it is also possible for the micropelletized thermoplastic elastomers to be incorporated into a polymer mixture composed of an oxymethylene homo- or copolymer and of other polymers, preferably from the group of the polyolefins, of the polyvinyl compounds, e.g. polyvinyl chloride, of the polystyrenes, of the polyvinyl acetates, of the polyvinyl alcohols, of the poly(meth)acrylates, of the polyacetals, of the polyamides, of the polyethers, of the polyesters, of the polycarbonates, or of the polyurethanes, the content of the polyoxymethylenes in the mixture preferably being above 50% by weight, particularly preferably above 80% by weight.

The inventive process can incorporate, into the polyoxymethylene matrix, not only the thermoplastic elastomers but also other compounds familiar to the person skilled in the art. Among these are in particular additives, such as formaldehyde scavengers, antioxidants, acid scavengers, UV stabilizers, light stabilizers, processing aids, coupling agents, lubricants, nucleating agents or mold-release agents, fillers, reinforcing materials, dyes and pigments, or electrically conducting additives.

The individual additives are incorporated via mixing of the components with the micropelletized thermoplastic elastomer and with the polyoxy-methylene, prior to or during the preparation of the polymer blend in step b).

Formaldehyde scavengers are in particular nitrogen-containing compounds which can react with formaldehyde. Among these are, for example, amides, such as dicyandiamides or polyamides, amino compounds, such as aliphatic diamines, aminotriazines, melamine or melamine derivatives, heterocyclic compounds, such as pyridazines, pyrimidines, pyrazines, pyrrolidones, or aminopyridines, and also piperidines and urea, and also urea derivatives. Particular preference is given to dicyandiamide, allantoin, hydantoin, and melamine. The amount of the formaldehyde scavengers mentioned added to the mixture is preferably up to 2% by weight.

Examples which may be mentioned of antioxidants are sterically hindered phenols, their amount added to the mixture preferably being up to 2% by weight. Examples of commercially available compounds of this type are pentaerythrityl tetrakis[3-(3,5-di-tert-butyl-4-hydroxyphenyl)propionate] (Irganox 1010, Ciba, Switzerland), triethylene glycol bis[3-(3-tert-butyl-4-hydroxy-5-methylphenyl)propionate] (Irganox 245, Ciba, Switzerland), 3,3'-bis[3-(3,5-di-tert-butyl-4-hydroxyphenyl)propionohydrazide] (Irganox MD 1024, Ciba, Switzerland), hexamethyleneglycol bis[3-(3,5-di-tert-butyl-4-hydroxyphenyl)propionate] (Irganox 259, Ciba, Switzerland), 3,5-di-tert-butyl-4-hydroxytoluene (Lowinox BHT, Great Lakes). Preference is given to Irganox 1010 and especially to Irganox 245.

Examples which may be mentioned of UV stabilizers of light stabilizers are benzotriazoles, benzophenone derivatives, or aromatic benzoate derivatives, oxanilides, or hindered amines (HALS). Preference is given to 2,2,6,6-tetramethyl-4-piperidyl compounds, e.g. bis(2,2,6,6-tetramethyl-4-piperidyl) sebacate (Tinuvin 770, Ciba, Switzerland), or the polymer composed of dimethyl succinate and 1-(2-hydroxyethyl)-4-hydroxy-2,2,6,6-tetramethyl-4-piperidine (Tinuvin 622, Ciba, Switzerland), the amount of these that can preferably be added to the mixture being up to 2% by weight.

Examples of processing aids that can be used are dispersing agents, such as high-molar-mass polyoxyalkylenes (in particular with molar mass above 25 000 g/mol), amide waxes, olefin waxes, or metal salts of fatty acids, among these are in particular polyalkylene oxides, for example polyethylene glycol, the alkali metal and alkaline earth metal salts, or salts of other divalent cations, e.g. $Zn^{2+}$, of long-chain fatty acids having more than 12 carbon atoms, examples being stearates, laurates, oleates, behenates, montanates, and palmitates.

Preferred lubricants that can be used are up to 25% by weight, particularly preferably up to 5% by weight, of a polytetrafluoroethylene powder, of a molybdenum disulfide powder, of a calcium carbonate (chalk) powder, of a graft copolymer which contains an olefin polymer as graft base and, grafted onto this, at least one vinyl polymer or one ether polymer, and/or a graft copolymer which contains an elastomeric core based on polydienes and a hard graft shell composed of (meth)acrylates and/or of (meth)acrylonitriles, or of an ultrahigh-molar-mass polyethylene powder (with molar mass>$10^6$ g/mol), or of a stearyl stearate, or of a silicone oil, in particular with molar mass>20 000 g/mol, or of an oxidized polyethylene wax (e.g. Licowachs PED 191, producer: Clariant GmbH, Germany), or of an amide wax (e.g. Licowachs C, producer, Clariant GmbH, Germany), or of an aliphatic ester wax composed of a fatty acid and of a monohydric alcohol, or of a polyethylene wax, by way of example.

Preferred examples of nucleating agents or mold-release agents are polyoxymethylene terpolymers or talc, the amount of these usually added to the molding composition being from 0.01 to 5% by weight, preferably from 0.1 to 2% by weight.

Examples of fillers or reinforcing materials that can be used are glass beads, wollastonite, loam, or graphite, or inorganic or organic fibers, such as glass fibers, carbon fibers, or aramid fibers, and thermoset plastics additives. Up to 40% by weight of these fillers and reinforcing materials can be added to the polymer mixture.

Dyes or pigments that can be used are any desired inorganic pigments, e.g. titanium oxide, zinc oxide, zinc sulfide, ultramarine blue, cobalt blue, or any desired organic dyes or pigments, e.g. phthalocyanines, anthraquinones, azo dyes, or carbon black, either individually or as a mixture. The amount of the colorants that can preferably be added to the mixture is up to 5% by weight.

Examples of electrically conducting additives that can be added to the mixture are metal powder or metal fibers, conductive carbon black, or electrically conductive polymers.

Unless explicitly otherwise defined, the abovementioned % by weight data are based on the total weight of the polymer blend.

INVENTIVE EXAMPLES

The following compounds were used in the inventive examples:

Oxymethylene copolymer 1 whose melt index MVR is 8 ml/10 min, prepared from a monomer mixture comprising trioxane and 3.4% by weight of 1,3-dioxolane, based on the total weight of the monomers used. Oxymethylene copolymer 2 whose melt index MVR is 24 ml/10 min, prepared from a monomer mixture comprising trioxane and 3.4% by weight of 1,3-dioxolane, based on the total weight of the monomers used.

Elastollan B85A (producer: Elastogran), commercially available pellets whose average particle diameter is 5 mm, or in micropelletized form.

Elastollan SP853 (producer: Elastogran), commercially available pellets whose average particle diameter is 5 mm, or in micropelletized form.

Irganox 1010 (antioxidant, producer: Ciba)
Licowachs C (producer: Clariant)
Terpolymer (Hostaform T1020, producer: Ticona)
Eurelon 975 (producer: Vantico)

Inventive Example 1

Micropelletization

The micropelletization of Elastollan grades B85A and SP853 was carried out by means of underwater pelletization. For this, plaques of the respective Elastollan grade were melted in an extruder at a pressure of about 155 bar and at a temperature of about 190° C. and passed through a die plate whose hole diameter was 0.38 mm, with Elastollan throughput of from 150 kg/h to 170 kg/h, and pelletized. The die plate temperature was from 260° C. to 290° C. The resultant micropellets were then dried in a Gala dryer. The residual moisture level of the resultant micropellets at the dryer centrifuge outlet was from 0.7 to 1.5% by weight. The pellets were then, by way of a drying section of length 25 m, subjected to a stream of cold air. The residual moisture level after drying was 0.7% by weight. The average particle diameter of the resultant pellets was about 400 μm.

Inventive Example 2

Preparation of Modified Polyoxymethylene Molding Compositions

To prepare the polyoxymethylene molding compositions, the mixtures mentioned below are intensively mixed and then mixed and pelletized in an extruder with stabilizer screw with low shear forces under the conditions listed in table 1.

Mixture 1: 90.65 parts of oxymethylene copolymer 1 (Flake MVR 8 ml/10 min), 9 parts of Elastollan B85A, 0.2 part of Irganox 1010, 0.15 part of Licowachs C.

Mixture 2: 81.65 parts of oxymethylene copolymer 1 (Flake MVR 8 ml/10 min), 18 parts of Elastollan B85A, 0.2 part of Irganox 1010, 0.15 part of Licowachs C.

Mixture 3: 89.19 parts of oxymethylene copolymer 2 (Flake MVR 24 ml/10 min), 10 parts of Elastollan SP853, 0.4 part of terpolymer, 0.35 part of Irganox 1010, 0.01 part of tricalcium citrate, 0.05 part of Eurelon 975.

Mixture 4: 79.19 parts of oxymethylene copolymer 2 (Flake MVR 24 ml/10 min), 20 parts of Elastollan SP853, 0.4 part of terpolymer, 0.35 part of Irganox 1010, 0.01 part of tricalcium citrate, 0.05 part of Eurelon 975.

The properties of the molding compositions are determined to:

VDA Empfehlung [Recommendation] No. 275, Dokumentation Kraftfahrwesen e.V. July 1994

ISO 527-1/-2 (measurement of tensile strain, measurement of modulus of elasticity)

ISO 179-1/1eA (Charpy notched impact resistance)

The results for the comparative examples have been collated in table 2, and the results for the molding compositions prepared according to the invention have been collated in table 3.

As is apparent from tables 2 and 3, the mechanical properties of the polyacetal molding compositions obtained using the claimed process are very little different from those of the molding compositions of the comparative examples. The polyacetal molding composition prepared according to the

TABLE 1

| Specimen | Screw velocity (rpm) | T (° C.) (zones) | T (° C.) (die plate) | T (° C.) (melt) | Pressure (bar) | Torque (%) | Throughput (kg/h) |
|---|---|---|---|---|---|---|---|
| Mixture 1 | 100 | 190 | 200 | 196 | 23 | 40 | 10 |
| Mixture 2 | 100 | 190 | 200 | 197 | 24 | 40 | 10 |
| Mixture 3 | 100 | 190 | 200 | 198 | 22 | 34 | 10 |
| Mixture 4 | 100 | 190 | 200 | 195 | 14 | 31 | 10 |

The resultant pellets were injection molded to give the corresponding test specimens for determination of mechanical properties and of formaldehyde emission.

As comparative examples 1 and 2, oxymethylene copolymers 1 were used by analogy with mixtures 1 and 2, and 9 parts or 18 parts of Elastollan B85A pellets whose average particle diameter is about 5 mm were incorporated into these. In order to achieve adequate mixing of the components, in contrast to the inventive examples, high shear forces have to be used during the extrusion process.

invention based on Hostaform S 9063 (mixture 1) has average notched impact resistance of 12.7 kJ/m$^2$ and average modulus of elasticity of 1933 MPa, and the corresponding molding composition of the comparative example has notched impact resistance 13.0 kJ/m$^2$ and average modulus of elasticity of 2010 MPa. The same applies to the molding compositions based on Hostaform S 9064, whose average notched impact resistance is 18.0 kJ/m$^2$ (17.4 kJ/m$^2$) and whose average modulus of elasticity is 1548 MPa (1640 MPa). However, the formaldehyde emission measured is lower by about half in the case of the test specimens produced according to the claimed process.

TABLE 2

| | Elastollan ($d_M$ = 5 mm) (parts) | Formaldehyde emission to VDA 275 (1.5 mm/7 d) | | | | Notched impact resistance (Charpy) | | | | Modulus of elasticity | | | |
|---|---|---|---|---|---|---|---|---|---|---|---|---|---|
| | | No. of specimens | average/min./max. (mg/kg) | | 3 s | No. of specimens | average/min./max. (mg/kg) | | 3 s | average/min./max. (MPa) | | | 3 s |
| Comparative example 1 | 9 | 14 | 13.70 | 3.74 | 27.7 | 20.7 | 16 | 13.0 | 10.0 | 15.5 | 4.6 | 2010 | 1870 | 2130 | 240 |
| Comparative example 2 | 18 | 9 | 11.20 | 6.11 | 18.5 | 12.7 | 9 | 17.4 | 16.3 | 18.0 | 1.6 | 1640 | 1545 | 1740 | 195 |

TABLE 3

| Polyacetal molding composition | Tensile strength (at break) (MPa) | Tensile strength (at yield) (MPa) | Tensile strain (at break) (%) | Tensile strain (at yield) (%) | Modulus of elasticity (MPa) | Notched impact resistance (Charpy) (kJ/m$^2$) | Formaldehyde emission to VDA 275 (1.5 mm/7 d) |
|---|---|---|---|---|---|---|---|
| Mixture 1 | 45.53 | 53.6 | 36.79 | 12.93 | 1940 | 12.48 | 5.43 |
| | 43.99 | 53.5 | 38.61 | 13.13 | 1906 | 13.01 | 5.22 |
| Mixture 2 | 40.69 | 45.9 | 39.26 | 16.66 | 1558 | 17.36 | 5.73 |
| | 40.65 | 45.5 | 38.70 | 16.66 | 1537 | 18.54 | 6.66 |
| Mixture 3 | 43.16 | 52.8 | 37.46 | 10.28 | 1964 | 10.91 | 1.18 |
| | 43.02 | 51.9 | 33.75 | 10.46 | 1934 | 10.99 | 1.24 |
| Mixture 4 | 39.77 | 43.5 | 28.37 | 12.72 | 1569 | 13.13 | 1.30 |
| | 40.28 | 43.9 | 27.25 | 12.48 | 1585 | 13.02 | 1.38 |

The invention claimed is:

1. A process for preparation of a polymer blend comprising at least one polyoxymethylene and at least one thermoplastic elastomer, the process comprising:
dispersing a thermoplastic elastomer in a polyoxymethylene, the polyoxymethylene being in flake form, where
a) the thermoplastic elastomer is or has been micropelletized by a pelletizing process and
b) the micropelletized thermoplastic elastomer pellets are dispersed in the flake polyoxymethylene via melting and mixing of the polyoxymethylene and the thermoplastic elastomer, wherein low shear forces are used to disperse the micropelletized thermoplastic elastomer in the polyoxymethylene, and the specific energy used to disperse the micropelletized thermoplastic elastomer in the polyoxymethylene is below 0.2 kWh/kg.

2. The process as claimed in claim 1, wherein the micropelletization of the thermoplastic elastomer takes place via underwater pelletization.

3. The process as claimed in claim 1, wherein the thermoplastic elastomer used is a thermoplastic polyurethane.

4. The process as claimed in claim 1, wherein the average particle diameter of the micropelletized thermoplastic elastomer is from 200 μm to 700 μm.

5. The process as claimed in claim 2, wherein the micropelletized thermoplastic elastomer is or has been dried to a moisture level below 1% by weight prior to dispersion in the polyoxymethylene matrix.

6. The process as claimed in claim 1, wherein the thermoplastic elastomer is dispersed in the polyoxymethylene matrix at a temperature of from 20° C. to 260° C.

7. The process as claimed in claim 1, wherein, prior to or during dispersion of the micropelletized thermoplastic elastomer in the polyoxymethylene matrix, other additives from the group of the formaldehyde scavengers, antioxidants, acid scavengers, UV stabilizers, light stabilizers, processing aids, adhesion promoters, lubricants, nucleating agents or mold-release agents, fillers, reinforcing materials, dyes and pigments, or electrically conductive additives are added.

8. The process as claimed in claim 1, wherein the micropelletized thermoplastic elastomer is dispersed in a polymer mixture that comprises other polymers in addition to the polyoxymethylene.

9. A molded product which comprises the polymer blend as claimed in claim 1.

10. The molded product of claim 9, wherein the product comprises a notched impact resistance of from 10 to 20 kJ/m$^2$.

11. The molded product of claim 9, wherein the product yields a formaldehyde emission of less than 10 mg/kg, according to the test procedure outlined in VDA No. 275.

12. The molded product of claim 9, wherein the product yields a formaldehyde emission of less than 5 mg/kg, according to the test procedure outlined in VDA No. 275.

13. The molded product of claim 9, wherein the product is injection molded.

14. The process as claimed in claim 1, wherein the specific energy used to disperse the micropelletized thermoplastic elastomer in the polyoxymethylene is from 0.08 to 0.15 kWh/kg.

15. The process as claimed in claim 1, wherein the polyoxymethylene has a comonomer content from 0.5 to 5% by weight and a melt index from 15 to 30 ml/10 min.

16. The process as claimed in claim 1, wherein the polyoxymethylene comprises 0.1 to 20 mol % of oxyethylene comonomers.

17. The process as claimed in claim 1, wherein the micropelletized thermoplastic elastomer is dispersed in the polyoxymethylene utilizing an extruder.

* * * * *